(No Model.)
L. N. PARKS
JACK SPOOL.
No. 378,174.  Patented Feb. 21, 1888.
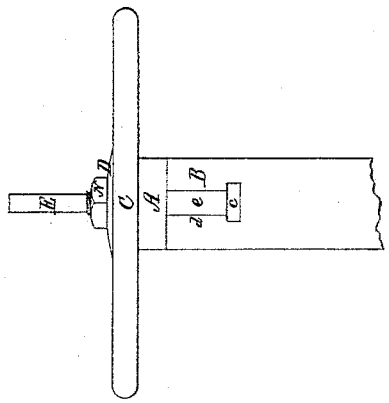
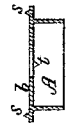
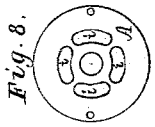
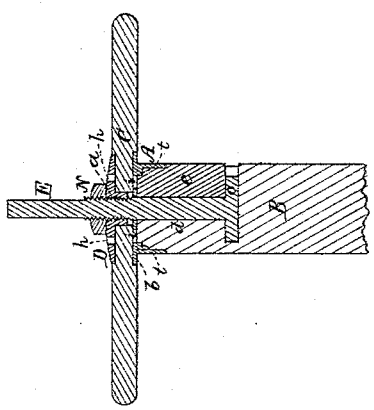
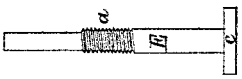
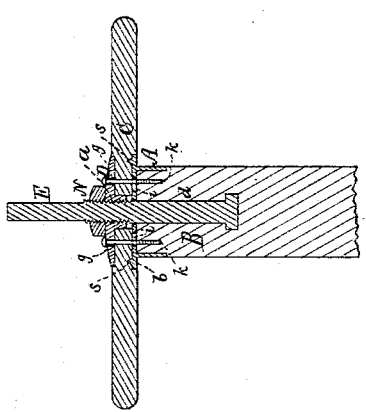
Witnesses
Inventor.
Levi N. Parks.
by Singleton & Piper att'ys

UNITED STATES PATENT OFFICE.

LEVI NELSON PARKS, OF WINCHENDON, MASSACHUSETTS, ASSIGNOR, BY MESNE ASSIGNMENTS, TO HIMSELF AND GEORGE N. GOODSPEED, OF SAME PLACE.

JACK-SPOOL.

SPECIFICATION forming part of Letters Patent No. 378,174, dated February 21, 1888.

Application filed October 26, 1887. Serial No. 253,427. (No model.)

*To all whom it may concern:*

Be it known that I, LEVI NELSON PARKS, of Winchendon, in the county of Worcester, of the Commonwealth of Massachusetts, have invented a new and useful Improvement in Jack-Spools; and I do hereby declare the same to be described in the following specification and represented in the accompanying drawings, of which—

Figure 1 is a side elevation, and Figs. 2 and 3 longitudinal sections, of one end of a "jack-spool" containing my invention, the nature of which is defined in the claims hereinafter presented. Fig. 4 is an end view, and Fig. 5 a side view, of the gudgeon as detached from the spool-body. The planes of section of Figs. 2 and 3 are taken through the axis of the spool and are at right angles to each other. Fig. 6 is a transverse section of the metallic cap or thimble, the plane of section being through its spurs, to be hereinafter described, they being represented in Fig. 3. Fig. 7 is a top view of the metallic disk or nut D; and Fig. 8 is a top view of the flanged thimble A, hereinafter referred to and described.

The invention constituting my present improvement has reference to the spool for which on October 19, 1885, I applied for a patent, the application being numbered 180,293, allowed December 17, 1885, and renewed December 15, 1887, the renewed application being numbered 257,954.

In carrying out my present invention I have combined with the metallic cap or thimble means not only of preventing it from accidentally revolving on the body of the spool, but of preventing the wooden head from accidentally revolving on the said thimble.

The invention described in my said application, filed October 19, 1885, was stated therein as an improvement having reference to the invention for which Letters Patent of the United States, No. 47,658, were granted to me.

In my present spool the gudgeon is formed with a cross-head on its end that is next the body, and the latter is socketed to receive the headed gudgeon, and is provided with a filling-piece to fill that part of the socket that extends beyond the gudgeon and its head. The gudgeon is screw-threaded from the end of the spool, and the disk screws upon the screw-threaded part of such gudgeon, which passes through the wooden head of the spool and the metallic flanged cap or thimble fitted on the body, all being substantially as shown in the drawings, in which the thimble is represented as having spurs projecting downward and others extending upward from it.

In said drawings, A denotes such flanged thimble, from whose flange two or other suitable number of spurs, $s\,s$, extend upward into the wooden head C. Another such spur or spurs, $t\,t$, project downward from the head of the thimble into the end of the body B of the spool. The cap or thimble encompasses and fits the said body at its end in manner as represented. The wooden head shown at C rests against the cap, the gudgeon E going through both and the metallic disk or nut D, the latter being screwed upon the gudgeon, which is screw-threaded, as shown at $a$, to receive the said disk or nut, and extends beyond it, as represented. Both the disk and the flange $b$ of the metallic cap enter the wooden head C.

The gudgeon projects axially into the spool-body, such gudgeon at its inner end being provided with a head, $c$. The spool body has in it a chamber or recess, $d$, to receive the gudgeon and prevent it from being drawn out of it (the said chamber) in a direction lengthwise of the gudgeon, the chamber opening laterally through the side and end of the body. There is inserted in the part of the chamber not occupied by the gudgeon a filling-piece, $e$, of wood, which is held in place by being extended into the cap A. This filling-piece may be glued or otherwise fastened within the chamber, it serving to aid in holding the gudgeon in connection with the body. The chamber and cross-head not only prevent the gudgeon from being drawn endwise out of the body, but from being revolved therein when the disk is being screwed either on or off the gudgeon.

In my improved jack-spool, when a breakage of either head occurs a new one can readily be substituted without having to remove the filling from the body; and, furthermore, there is no danger of the head working loose, so as to allow yarn to get between it and the cap.

Nor is there any liability of the gudgeon becoming accidentally loose, so as to impair the connection of the head with the body of the spool.

In order to aid in preventing the metallic disk D from accidentally working loose upon the gudgeon, there is screwed upon the latter and against the said disk a nut, N, as represented. The metallic disk D is shown as having four holes, *g g* and *h h*, made through it at equal distances apart, and the thimble A is also represented as having curved slots *i* made in it, such being to enable pins or screws *k k* to be inserted in the two holes *g g* and thence through the thimble and into the body B, as shown in Fig. 3, such screws or pins being useful auxiliaries for keeping the parts of the spool in conjunction.

I do not herein claim, broadly, the combination of each or either gudgeon, screw-threaded and provided with the cross-head, as described, the wooden body chambered to receive the gudgeon and having in the chamber with the said gudgeon a filling-piece, the cap or thimble arranged on the body and filling-piece, the wooden head placed on the gudgeon and against the said cap, and the metallic disk screwed upon the gudgeon and against the wooden head, all being substantially as set forth.

I claim—

1. The combination of each or either gudgeon, screw-threaded and provided with the cross-head, as described, the wooden body chambered to receive the said gudgeon and having in the chamber with said gudgeon a filling-piece, the cap or thimble arranged on the said body and filling-piece, the wooden head placed on the gudgeon and against the said cap, spurs projecting from the said cap or thimble into the said head and body, and the metallic disk screwed upon the said gudgeon and against the said head, all being substantially as set forth.

2. The combination of each or either gudgeon, screw-threaded and provided with the cross-head, as described, the wooden body chambered to receive the said gudgeon and having in the chamber with said gudgeon a filling-piece, the cap or thimble arranged on the said body and filling-piece, the wooden head placed on the gudgeon and against the said cap, spurs projecting from the said cap or thimble into the said head and body, the metallic disk screwed upon the said gudgeon and against the said head, and the clamp-nut screwed on the said gudgeon and against the said disk, all being substantially as set forth.

3. The combination of the gudgeon, screw-threaded and provided with the cross-head, as described, the wooden body chambered to receive the said gudgeon and a filling-piece, the cap or thimble having slots in its top and arranged on the said body and filling-piece, the wooden head placed on the gudgeon concentrically thereof and against the said cap or thimble, spurs projecting from the said cap or thimble into the said head and body, the metallic disk having holes in it, as represented, and screwed upon the said gudgeon, and the pins or screws going through such disk and thimble and into the wooden body, all being substantially as set forth.

LEVI NELSON PARKS.

Witnesses:
FRANK B. SPALTER,
ADIN I. GOODSPEED.